(12) United States Patent
Hata

(10) Patent No.: US 8,645,593 B2
(45) Date of Patent: Feb. 4, 2014

(54) SIGNAL PROCESSOR, TRANSMISSION APPARATUS, AND METHOD FOR PROCESSING SIGNAL

(75) Inventor: Akihiro Hata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 118 days.

(21) Appl. No.: 12/830,509

(22) Filed: Jul. 6, 2010

(65) Prior Publication Data

US 2011/0055496 A1 Mar. 3, 2011

(30) Foreign Application Priority Data

Aug. 31, 2009 (JP) ................................. 2009-199495

(51) Int. Cl.
*G06F 13/00* (2006.01)
(52) U.S. Cl.
USPC ............................................................ 710/34
(58) Field of Classification Search
None
See application file for complete search history.

(56) References Cited

U.S. PATENT DOCUMENTS

| 4,800,562 A | 1/1989 | Hicks | |
| 6,269,390 B1* | 7/2001 | Boland | 718/100 |
| 6,728,955 B1 | 4/2004 | Berry et al. | |
| 2003/0223447 A1* | 12/2003 | Saxena et al. | 370/428 |
| 2008/0043897 A1* | 2/2008 | Gara et al. | 377/20 |

FOREIGN PATENT DOCUMENTS

| JP | 59-121541 | 7/1984 |
| JP | 64-42747 | 2/1989 |
| JP | 2009-081816 | 4/2009 |
| WO | WO 2004/112250 | 12/2004 |

OTHER PUBLICATIONS

United Kingdom Patent Office Search Report dated Nov. 11, 2010 for corresponding Great Britain Application No. GB1013558.0.
Japanese Patent Office Notice of Rejection mailed May 14, 2013 for corresponding Japanese Application No. 2009-199495.
Japanese Office Action Issued Oct. 29, 2013 in corresponding Japanese Patent Application No. 2009-199495.

* cited by examiner

*Primary Examiner* — Henry Tsai
*Assistant Examiner* — Aurangzeb Hassan
(74) *Attorney, Agent, or Firm* — Staas & Halsey LLP

(57) ABSTRACT

A signal processor includes a processor that counts the number of input data pieces or a size of each of the input data pieces; a first memory that stores a result of the counting by the processor; and a second memory that records whether the result of the counting exceeds a capacity of the first memory.

10 Claims, 10 Drawing Sheets

SIGNAL PROCESSOR, TRANSMISSION APPARATUS, AND METHOD FOR PROCESSING SIGNAL

CROSS-REFERENCE TO RELATED APPLICATION

This application is based upon and claims the benefit of priority of the prior Japanese Patent Application No. 2009-199495, filed on Aug. 31, 2009, the entire contents of which are incorporated herein by reference.

FIELD

The embodiments discussed herein are related to a signal processor, a transmission apparatus, and a method for processing signals. The transmission apparatus can be included in a network such as a Local Area Network (LAN) or a Wide Area Network (WAN).

BACKGROUND ART

In a communication network including a number of transmission apparatuses, data providing various services (e.g., audio, moving picture, and user data) are transmitted.

Such transmission apparatus may collect statistics information in the form of the number of data pieces passing through the apparatus itself or the size of each data pieces for each service with the intention of monitoring a state of traffic of each service.

As one example, a hardware counter equipped with a counter processor and a memory is implemented in an interfacing section of a transmission apparatus. With this configuration, the counter processor counts the statistics information and stores the result of the counting into the memory.

The statistics information stored in the memory is collected and compiled by, for example, a controller that controls the transmission apparatus and may be displayed on a user interface (e.g., on a display screen) of the transmission apparatus.

The Patent Literature 1 discloses an accumulation processor equipped with an adder and a counter that counts the number of times of occurring a carry signal in the adder, so that the load on the accumulation processor can be reduced.

Patent Literature 1: Japanese Patent Publication No. SHO 59-121541

In the above method, overflow of the memory is avoided by the controller initializing (clearing) the value of the memory after reading the statistics information from the memory, for example. Here, the phenomenon "overflow" is caused when a count value to be input into the counter is larger than the capacity of the counter (i.e., the upper limit of the countable value of the counter determined in terms of the memory capacity (i.e., the bit width) of the counter).

However, if the memory overflows before the controller clears the value of the memory, the controller cannot collect and compile the statistics information correctly.

One of the solutions to the problem is to implement a memory that has a sufficiently large capacity (bit width) in the transmitting apparatus so that the memory would not overflow despite a large amount of traffic through the transmission apparatus before the controller collects the statistics information.

In accordance with recent increase in speed of a transmission apparatus and in density of the number of services accommodated, the number of data pieces passing through the transmission apparatus and the sizes of such data pieces are expanding. This leads a significant increase in amount of statistics information collected and compiled by the controller.

Here, the capacity of the memory can be expressed by the following formula (1).

$$\text{Memory\_Size(bit)} = \text{Bit\_width(bit)} \times \text{entry\_num}(pcs) \quad (1)$$

where, "Memory_Size" represents the capacity of the memory; "Bit_width" represents a bit width of an extent that does not cause overflow; "entry_num" represents the number of entries whose statistics information is to be monitored.

For example, when the transmission apparatus monitors statistics information for each user, the "entry_num" is identical to the maximum number of users being in charge of the transmission apparatus.

The numbers of "Memory_Size", "Bit_width", and "entry_num" are natural numbers. Here the unit [pcs] of the "entry_num" is an abbreviation of piece.

The "Bit_width" is calculated by the following formula (2).

$$\text{Bit\_width(bit)} > \log_2[\text{Max}(V\_PS) \times \text{Polling\_cycle}] \quad (2)$$

where, "Max (V_PS)" represents a maximum amount of data passing through the transmission apparatus per second; "Polling_cycle" represents an interval between collections of the statistics information by the controller. Here, when the hardware counter counts the number of frames passing through the transmission apparatus, Max(V_PS) represents the maximum number of frames per second while when the hardware counter counts the number of bytes of data, Max (V_PS) represents the maximum number of bytes per second. The value of the Max(V_PS) is determined in terms of, for example, the physical speed of the interface section of the transmission apparatus and the kind of object to be counted.

Here, assuming cases where an interface (e.g., a data communication card) having an interfacing speed of 100 Gbps monitors services for each users (the number of users is 65536 [pcs]). For example, when the number of bits of data is to be monitored, Max (V_PS) is $100 \times 10^8$, and, even if the "Polling_cycle" is set to be 1 second, the "Bit_width" is as much as 34 bits from the formula (2).

The "entry_num" being 65536 [pcs] determines the memory capacity "Memory_Size"=2,228,224 bits≈2.2 M bytes on the basis of the formula (1).

Normally, since each service supports several to several dozens kinds of statistics information piece, the memory requires a capacity as large as several dozens mega bits.

As a consequence, the number of memories implemented in the hardware counter to collect and compile such statistics information pieces increases, which may hinder the integration of the hardware from aspects of the implementation area and consumption power.

In addition, even when the number of users is small, a memory dedicated to counting statistics information is required if an internal memory of the Application Specific Integrated Circuit (ASIC) or the Field Programmable Gate Array (FPGA) is insufficient or cannot be used without restriction, which may also hinder the integration of the hardware.

SUMMARY (1) According to an aspect of the embodiments, an apparatus includes a signal processor including: a processor that counts the number of input data pieces or a size of each of the input data pieces; a first memory that stores a result of the counting by the processor; and a second memory that records whether the result of the counting exceeds a capacity of the first memory.

(2) According to an aspect of the embodiments, an apparatus includes a transmission apparatus including the above signal processor.

(3) According to an aspect of the embodiments, a method includes a method for processing signals including: counting the number of input data pieces or a size of each of the input data pieces; storing the result of the counting into a first memory; and recording whether the result of the counting exceeds a capacity of the first memory into a second memory different from the first memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will be described with reference to the drawings. Note that the embodiments are not limited to the embodiments to be described below, but may be modified in various ways without departing from sprits and scope of the embodiments, as a matter of course.

(1) First Embodiment (1.1) Configuration of a Network

Figure 1:
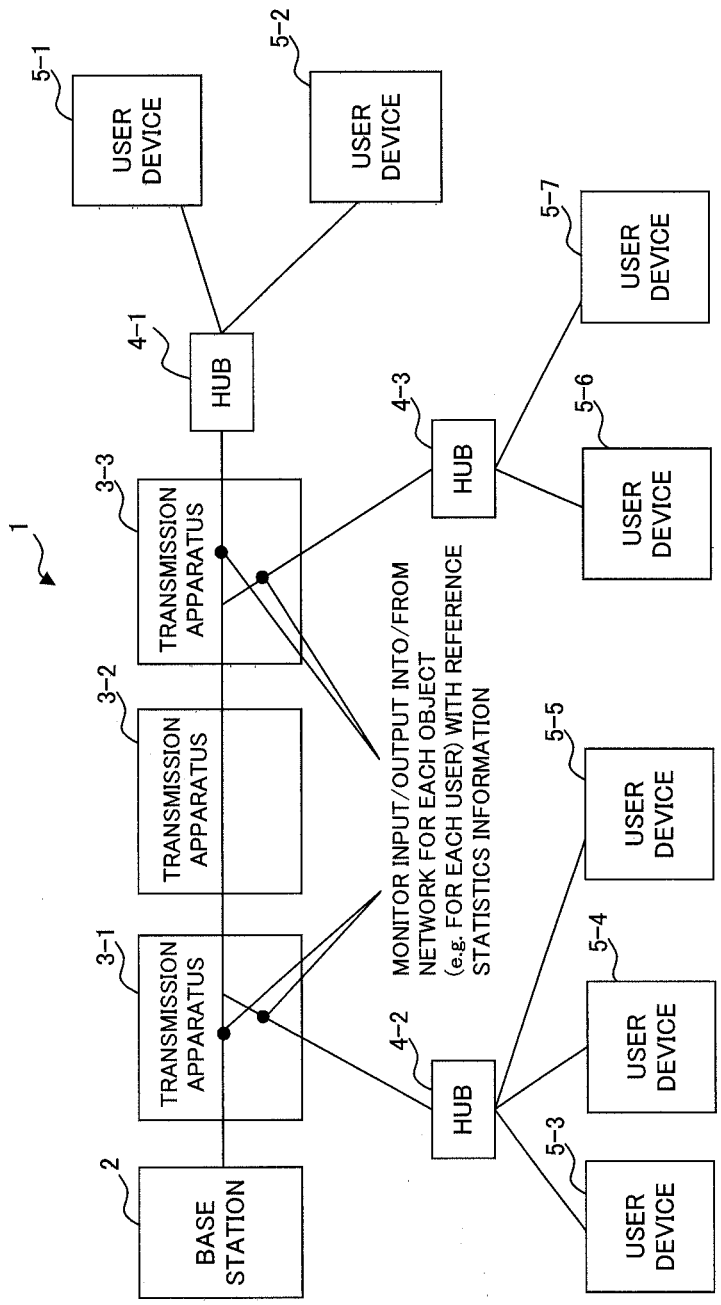
FIG. 1 is a drawing illustrating an example of a configuration of a network according to a first embodiment.

FIG. 1 illustrates an example of the configuration of a network according to the first embodiment.

A network 1 illustrated in FIG. 1 exemplarily includes a base station 2, transmission apparatuses 3-1 through 3-3, line concentrators (HUBs) 4-1 through 4-3, and user devices 5-1 through 5-7. If there is no need to discriminate the transmission apparatuses 3-1 through 3-3 from one another, the HUBs 4-1 through 4-3 from one another, and the user devices 5-1 through 5-7 from one another, the elements are called the transmission apparatus 3, the HUB 4, and the user device 5. The number of transmission apparatuses 3, and the number of HUBs 4, and the number of user devices 5 are not limited to those in the example of FIG. 1. The configuration of the network 1 is not also limited to that of FIG. 1, which is merely an example.

Here, the base station 2 transmits data to the user devices 5 and receives data from the user devices 5. In the example of FIG. 1, the base station 2 transmits and receives data to and from the user devices 5-3 through 5-5 through the transmission apparatus 3-1 and the HUB 4-2; transmits and receives data to and from the user devices 5-1 and 5-2 through the transmission apparatuses 3-1 through 3-3 and the HUB 4-1; and transmits and receives data to and from the user devices 5-6 and 5-7 through the transmission apparatuses 3-1 through 3-3 and the HUB 4-3. Data transmitted and received between the base station 2 and the user devices 5 may be, for example, frames or packets.

Data transmitted and received between the base station 2 and the user devices 5 is, for example, audio data, image data, moving picture data and/or others, and may vary with service.

The transmission apparatuses 3 relay the data. Each transmission apparatus 3 of the first embodiment monitors (collects and compiles) statistics information, such as the number (data number) of data pieces passing through the same apparatus 3 and the size (the number of data bytes or the number of data bits) of each of the data pieces, for each monitoring object (e.g., each user).

In the network 1 of FIG. 1, the transmission apparatuses 3 are disposed between the base station 2 and the HUBs 4, and each transmission apparatus 3 monitors statistics information of data passing through the same apparatus 3.

The HUBs 4 distribute data from the base station 2 to the user devices 5 and transmit data from the user devices 5 to the base station 2. The HUBs 4 may be configured to be switching HUBs that are capable of data distribution based on, for example, Media Access Control (MAC) address. Alternatively, the HUBs 4 may be configured to be small base stations wirelessly coupled to user devices 5.

The user devices 5 receive data from the base station 2 and transmit data to the base station 2. In the first embodiment, the user devices 5 transmit and receive data to and from the base station 2 via the transmission apparatuses 3 and the HUBs 4. The user devices 5 may be fixed or mobile terminals.

In the network 1 of the first embodiment, the transmission apparatuses 3 are disposed between the base station 2 and the user devices 5. This configuration makes each transmission apparatus 3 possible to collect and compile statistics information of data transmitting through the network 1.

(1.2) Transmission Apparatus 3

Figure 2:
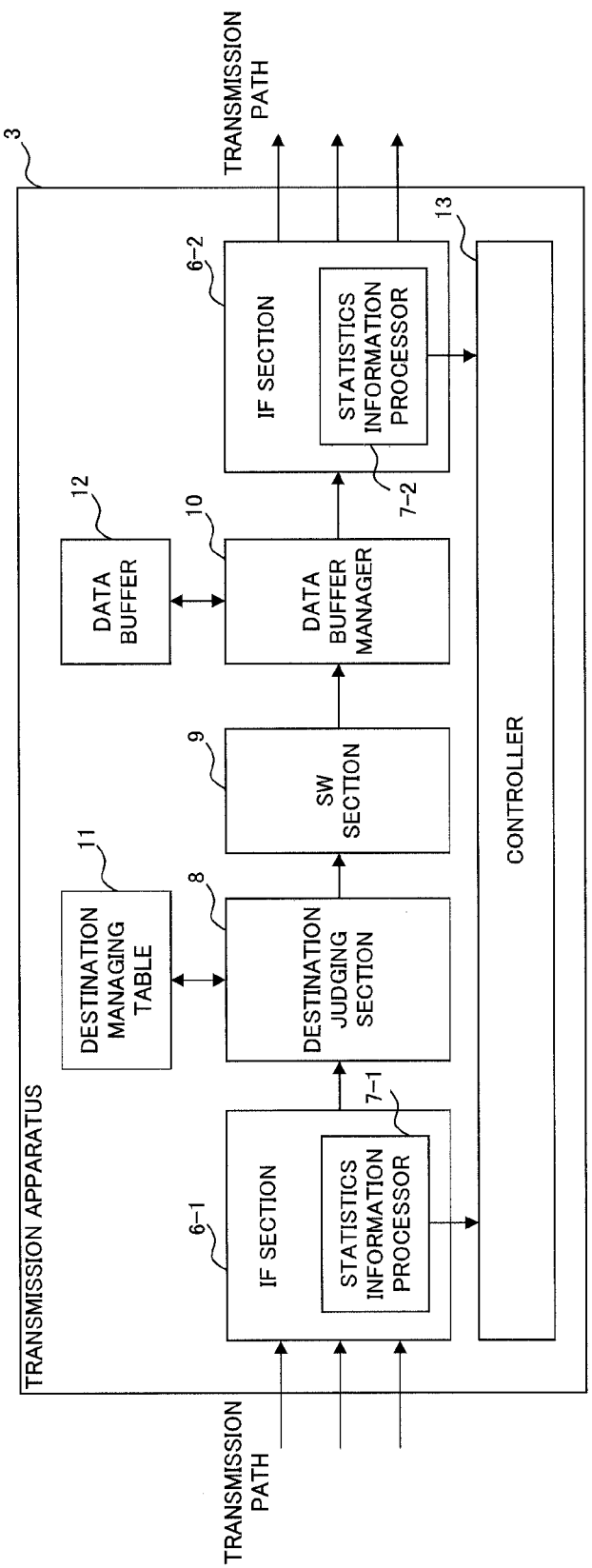
FIG. 2 is a drawing illustrating an example of a configuration of a transmission apparatus of FIG. 1.

FIG. 2 illustrates an example of the configuration of the transmission apparatus 3 according to the first embodiment.

The transmission apparatus 3 illustrated in FIG. 2 exemplarily includes interface (IF) sections 6-1 and 6-2, a destination judging section 8, a switch (SW) section 9, a data buffer manager 10, a destination managing table 11, a data buffer 12, and a controller 13. If there is no need to discriminate the IF sections 6-1 and 6-2 from each other, these elements are simply called the IF sections 6.

The IF sections 6-1 and 6-2 include an interfacing function for transmitting and receiving data to and from the base station 2, the HUBs 4, and the user devices 5. The IF sections 6 may be wirelessly coupled to the base station 2, the HUBs 4, and the user devices 5 or may be wired to the base station 2, the HUBs 4, and the user devices 5.

The IF section 6-1 collects and compiles statistics information of the number of data pieces (hereinafter also called received data pieces) received from the base station 2, the HUBs 4, and the user devices 5, or the sizes of each received data piece. In the meantime, the IF section 6-2 collects and compiles the number of data pieces (hereinafter also called transmitting data pieces) that are to be transmitted to the base station 2, the HUBs 4, and the user devices 5, or the size of each transmitting data pieces.

For this purposes, the IF sections 6-1 and 6-2 include statistics information processors 7-1 and 7-2, respectively. When there is no need to discriminate the statistics information processors 7-1 and 7-2 from each other, the elements are simply called the statistics information processors 7.

The statistics information processor 7 collects and obtains the statistics information about data pieces transmitted and received by the corresponding IF section 6. The statistics information collected and obtained by the statistics information processor 7 is, for example, read by the controller 13 at regular or irregular timings and then deleted (read and cleared). The detailed configuration and processes of the statistics information processor 7 will be described in the next section (1.3).

The controller 13 controls processes performed by the transmission apparatus 3. For example, the controller 13 of this example reads the statistics information collected and compiled by the statistics information processor 7 at regular or irregular timings. Additionally, for example, the controller 13 is allowed to read the statistics information from the statistics information processor 7 and then clear the same statistics information stored in the statistics information processor 7.

Furthermore, the controller 13 may display statistics information read from the statistics information processor 7, and various management information pieces calculated on the basis of the statistics information on the user interface (e.g. the display screen) of the transmission apparatus 3.

The destination managing table 11 retains identification information to identify user devices 5 and transmission destinations (e.g., information of output ports of the transmission apparatus 3 and the transmission paths coupled to the ports) of data pieces in association with each other.

The destination judging section 8 judges the destination of a received data piece on the basis of identification information (e.g., destination information or service kind information) attached to the same received data piece and the contents of the destination managing table 11. The result of the judgment by the destination judging section 8 is transmitted to, for example, the SW section 9 in conjunction with the received data pieces.

The SW section 9 switches the output destination of a received data piece on the basis of the result of the judgment by the destination judging section 8. For example, the SW section 9 creates a transmitting data piece by attaching destination information based on the result of the judgment to the received data piece and outputs the created data piece to the data buffer manager 10.

The data buffer 12 stores a transmitting data piece, and for example, temporarily retains the transmitting data piece in accordance with timings of data transmission.

The data buffer manager 10 stores transmitting data pieces from the SW section 9 in the data buffer 12 while reads transmitting data pieces stored in the data buffer 12 at predetermined timing and outputs the read data pieces to the IF section 6-2.

The IF section 6-2 transmits a transmitting data piece to the transmission destination according to identification information (e.g., the output port of the transmission apparatus 3 and the transmission path coupled to the port) attached to the same transmitting data piece.

As the above, the transmission apparatus 3 of this example is capable of relaying data between the base station 2 and the user devices 5, additionally collecting and obtaining the statistics information of the same data and displaying the statistics information on the monitor so that the statistics information can be provided to the user and the network manager.

Next, description will now be made in relation to the configuration of and the processes performed by the statistics information processor 7 and the controller 13.

(1.3) The Statistics Information Processor 7 and the Controller 13

Figure 3:
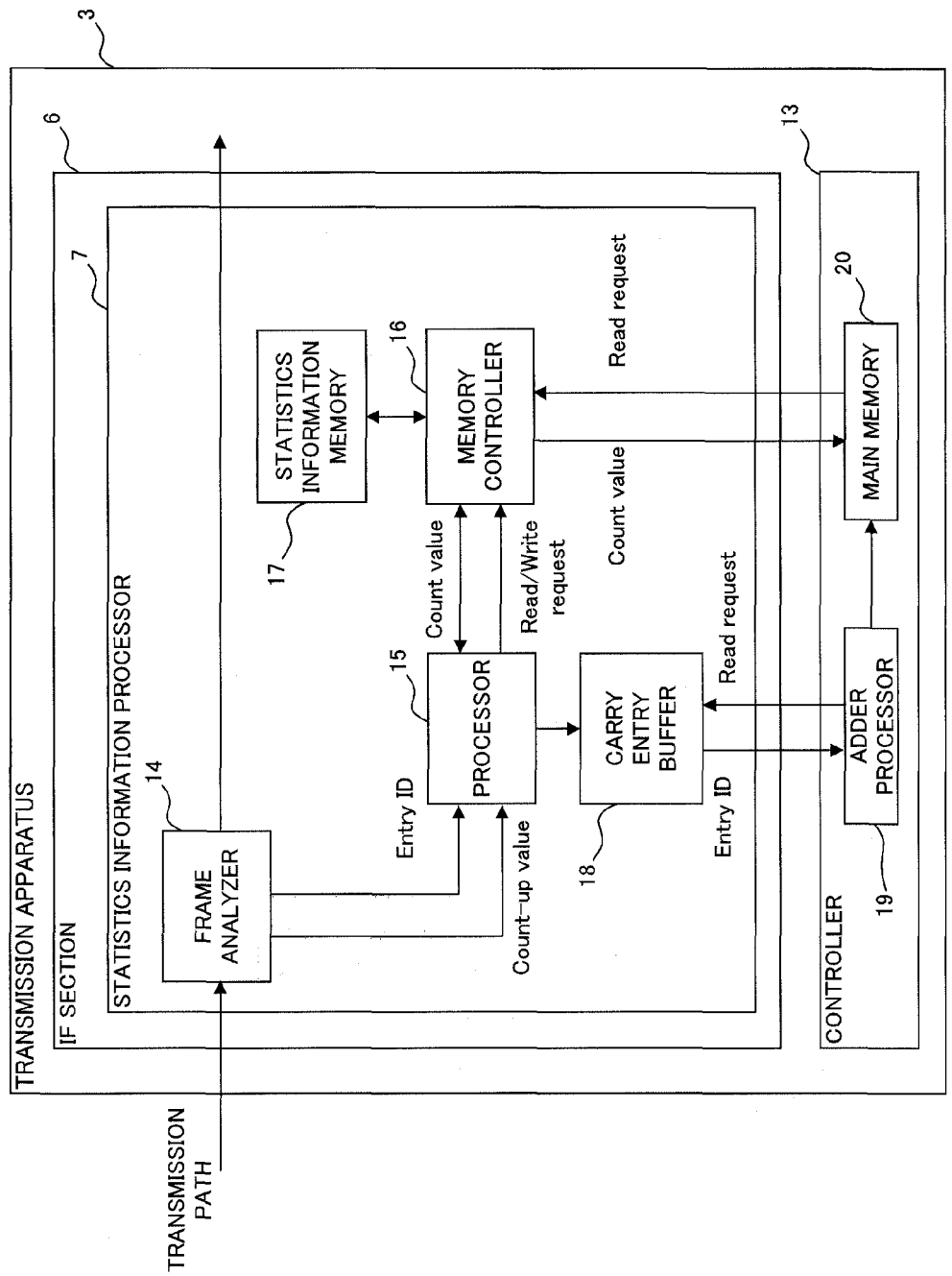
FIG. 3 is a diagram illustrating an example of a configuration of a statistics information processor and a controller of a transmission apparatus of FIG. 2.

FIG. 3 illustrates an example of the configurations of the statistics information processor 7 and the controller 13 of the first embodiment.

The statistics information processor 7 exemplarily illustrates a frame analyzer 14, a processor 15, a memory controller 16, a statistics information memory 17, and a carry entry buffer 18.

The frame analyzer 14 analyzes data input from the transmission path. For example, the frame analyzer 14 of this embodiment obtains a count-up value and the identification information (entry ID) that the frame of received data piece belongs through the analysis on the frame, and notifies the processor 15 of the obtained value and identification information. Here, assuming that the statistics information processor 7 serves to function as a frame counter, the count-up value is "1" while assuming that the statistics information processor 7 serves to function as a byte counter, the count-up value is the byte length of the received data piece.

The processor 15 counts statistics information (i.e., the number of input data pieces and/or the size of each received data piece) of the data pieces input into the transmission apparatus 3. Additionally, the processor 15 issues a read/write request for a count value to the memory controller 16, and stores the statistics information into the statistics information memory 17. For example, the processor 15 can request the memory controller 16 to read the current count value of the entry ID notified by the frame analyzer 14, add the count-up value to the read count value, and write the result of the addition to the statistics information memory 17.

Furthermore, the processor 15 of this example is capable of judging whether or not the result of the addition exceeds the capacity of the statistics information memory 17 (i.e., occurrence of overflow). If the judgment concludes the occurrence of overflow, the processor 15 writes information about the entry ID that overflows with the count value into the carry entry buffer 18 and also writes a count value circulated by the overflowing (i.e., the overflowed value) into the statistics information memory 17.

In other words, when the result of the counting exceeds the capacity of the statistics information memory 17, the processor 15 is allowed to store the difference between the result of the counting and the upper limit of the capacity into the statistics information memory 17.

Alternatively, if the judgment concludes the occurrence of overflow, the processor 15 may rewrite the count value after the addition into the statistics information memory 17. In this case, the statistics information memory 17 may be, for example, configured to be a cyclic memory that is capable of storing, when a count value exceeding the allowable count value is written into the statistics information memory 17 itself, a value obtained through deducting the allowable count value from the written count value.

The memory controller 16 controls reading/writing of the count value from/into the statistics information memory 17 and reading/clearing of the count value in response to a read/write request from the processor 15 and a read/clear request from the controller 13, respectively.

The statistics information memory (a first memory) 17 stores the result of counting (i.e., the count value) obtained by the processor 15. For example, the statistics information memory 17 of this embodiment is capable of retaining the count value for each entry ID. Here, the statistics information memory 17 of this example is configured to be a cyclic counter that circulates the count value thereof when overflow occurs. Specifically, a cyclic counter can retain a count value obtained through deducting, in the event of occurrence of overflow, the overflow from the counted value.

Figure 4:
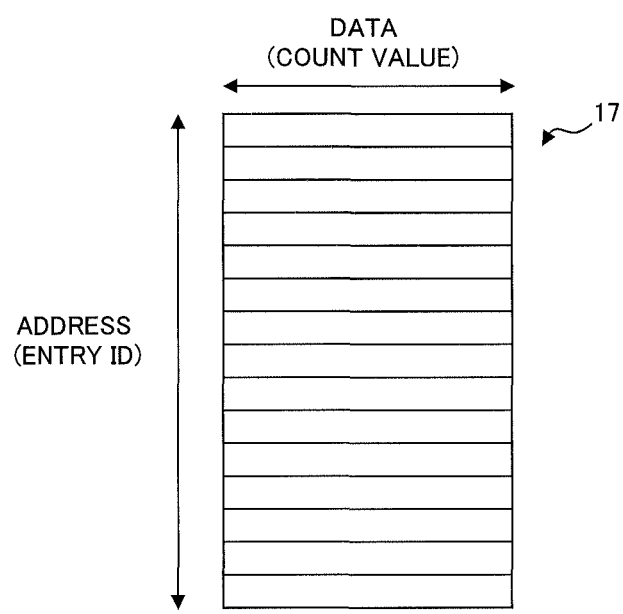
FIG. 4 is a diagram illustrating an example of a configuration of a statistics information memory.

FIG. 4 illustrates an example of the configuration of the statistics information memory 17.

As illustrated in FIG. 4, the statistics information memory 17 exemplarily includes entry IDs that represent monitoring objects for statistics information in the address direction (the top-to-bottom direction) and retains the count values for the respective entry IDs in data regions of respective address regions.

Namely, the statistics information memory 17 of this example includes a number of memory regions each of which has a width of N (natural number) bits, and is therefore capable of storing the results of counting for respective entry IDs by the processor 15 in the memory regions in association between the entry IDs and the memory regions.

The carry entry buffer 18 stores information of an entry ID associated with an address region at which overflow (overflow of a data region in the statistics information memory 17) occurs due to the addition in the processor 15.

In other words, the carry entry buffer 18 of this embodiment functions as an example of a second memory that records whether the result of counted by the processor 15 exceeds the capacity of the statistics information memory 17.

Figure 5:
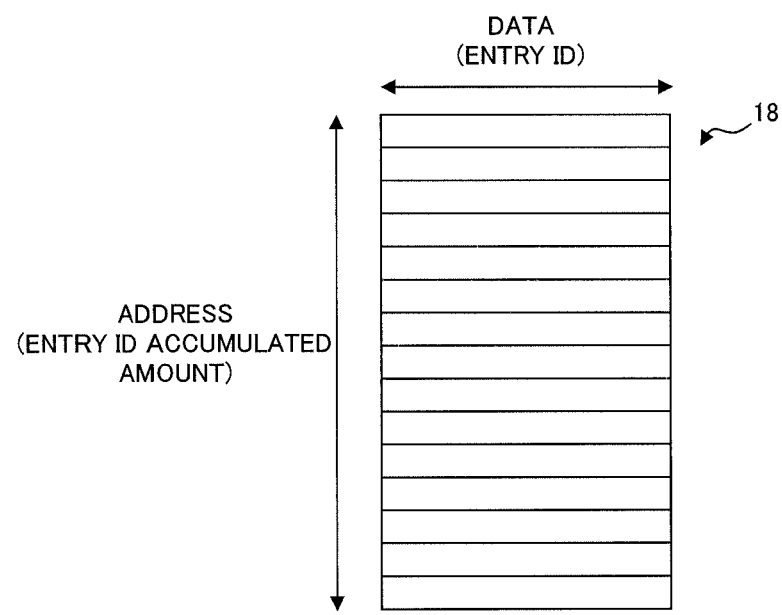
FIG. 5 is a diagram illustrating an example of a configuration of a carry entry buffer.

FIG. 5 illustrates an example of the configuration of the carry entry buffer 18.

As illustrated in FIG. 5, the carry entry buffer 18 of this embodiment exemplarily includes a number of data regions that store overflowing entry IDs in the address direction indicating an amount of accumulating of entry IDs.

The controller 13 calculates statistics information of input data on the basis of the contents of the carry entry buffer 18 and the contents of the statistics information memory 17. For example, the controller 13 of the first embodiment reads and then clears the value of the statistics information memory 17 at regular or irregular timings, and stores the result of reading into a main memory 20. For this purpose, the controller 13 of the first embodiment exemplarily includes an adder processor 19 and the main memory 20.

The main memory 20 collects and counts the value (statistics information) of the statistics information memory 17 at regular or irregular timings and stores the results of collecting and counting for each entry ID. In addition, the main memory 20 of the first embodiment can update the result of collecting and counting of the value from the statistics information memory 17 using the result of the addition in the adder processor 19. In this example, the controller 13 expands the values collected and counted from the statistics information memory 17 into the main memory 20, but the manner of expanding is not limited to this. Alternatively, the statistics information may be expanded into another memory or may be directly displayed on user interface (e.g., a display screen).

The adder processor 19 reads information about an overflowing entry ID from the carry entry buffer 18. For example, the adder processor 19 adds "the maximum value that the data region of the statistics information memory 17 can counts +1" to the value of the statistics information corresponding to the overflowed entry ID retained in the main memory 20, so that the value of the overflowed entry ID is updated.

Next, description will now be made in relation to an example of operation of the transmission apparatus 3 having the above structure.

(1.4) Example of Operation of the Transmission Apparatus 3

Figure 6:
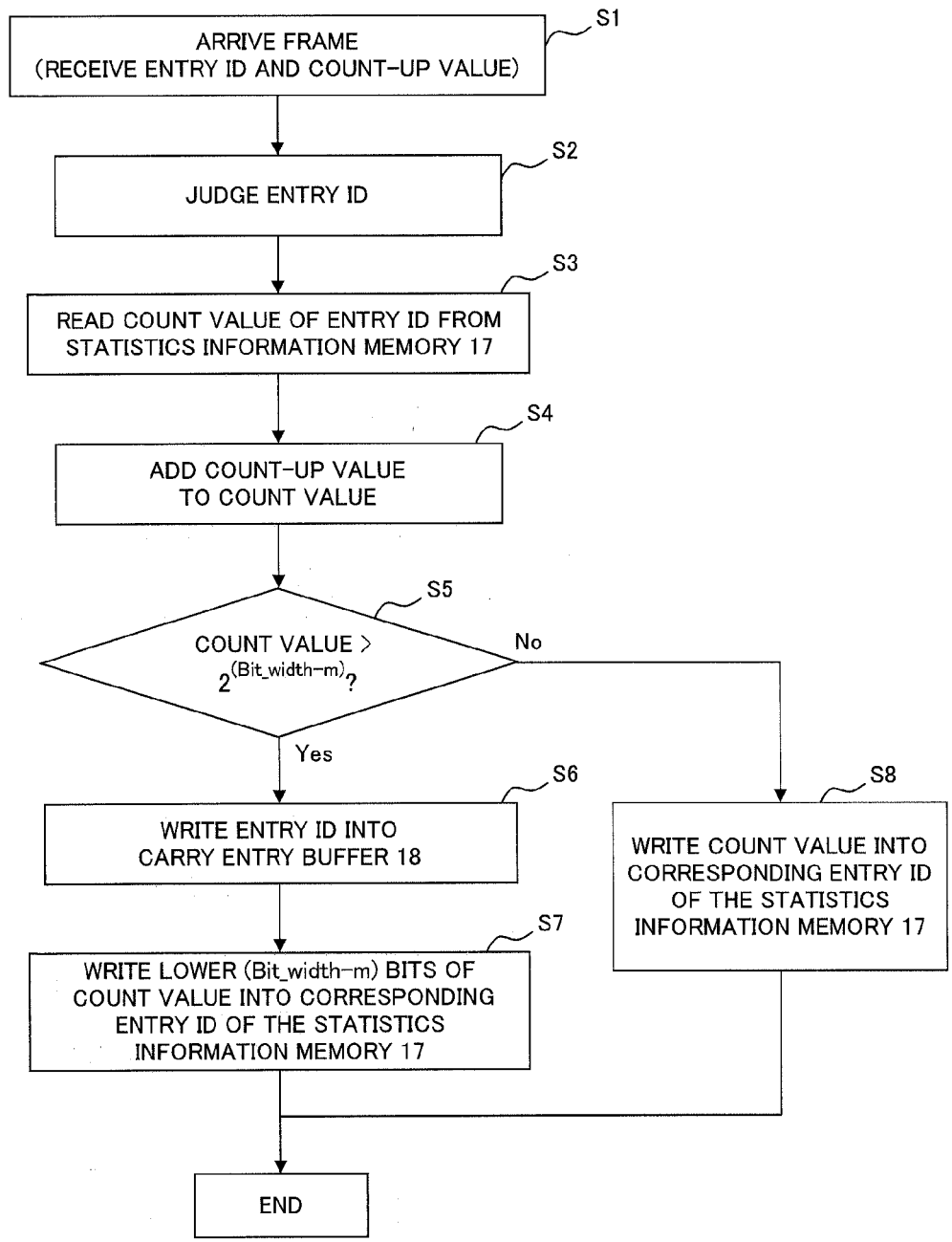
FIG. 6 is a flow chart illustrating an example of a succession of procedural steps of a transmission apparatus of FIG. 2.
Figure 7:
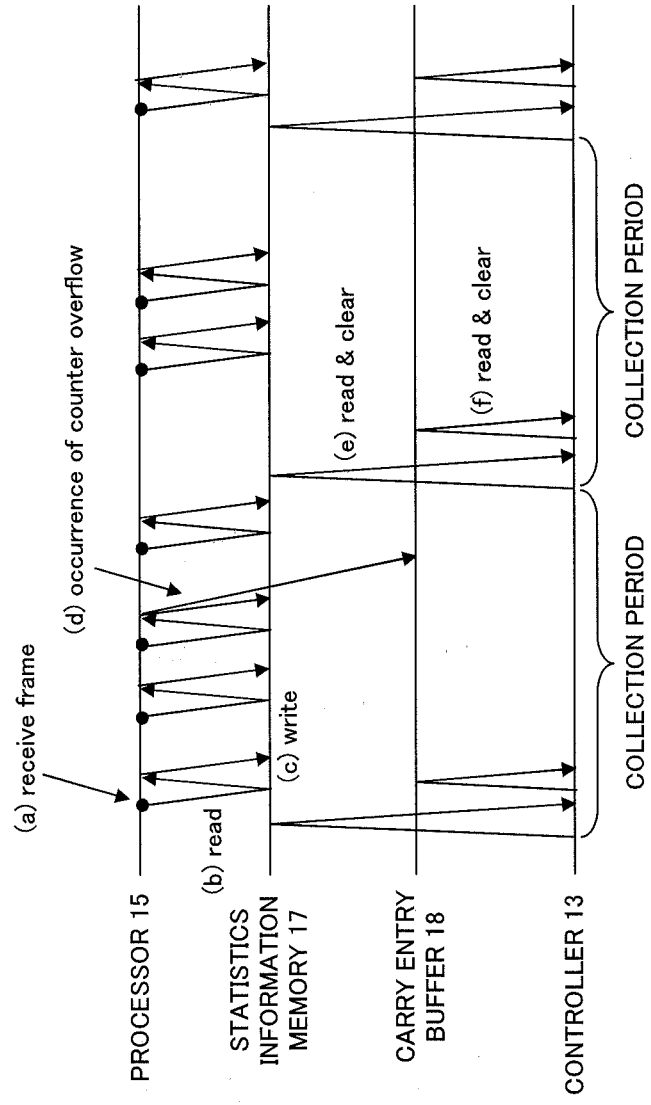
FIG. 7 is a time chart illustrating an example of a succession of procedural steps of a transmission apparatus of FIG. 2.

FIG. 6 is a flow chart of an example of operation of the transmission apparatus 3; and FIG. 7 is a time chart of an example of operation of the transmission apparatus 3.

Firstly, upon receipt of a data piece (e.g., a frame or packet) from another apparatus (e.g., the base station 2, another transmission apparatus 3, a HUB 4, or a user device 5) (see symbol (a) in FIG. 7), the frame analyzer 14 analyses the received data piece. For example, the frame analyzer 14 obtains the entry ID or the count-up value of the arrived data frame (see step S1 in FIG. 6). As described above, assuming that the statistics information processor 7 serves to function as a frame counter, the count-up value is "1" while assuming that the statistics information processor 7 serves to function as a byte counter, the count-up value is the byte length of the received data piece. The entry ID and the count-up value obtained by the frame analyzer 14 are notified to the processor 15.

Then, the processor 15 judges the entry ID notified from the frame analyzer 14 (see step S2 in FIG. 6), and reads the count value associated with the notified entry ID from the statistics information memory 17 through the memory controller 16 (see step S3 in FIG. 6 and symbol (b) in FIG. 7).

After that, the processor 15 adds the count-up value notified from the frame analyzer 14 to the count value read from the statistics information memory 17 (see step S4 in FIG. 6).

At that time, the processor 15 judges whether or not the result of the addition exceeds the memory capacity (i.e., the memory size) of the statistics information memory 17 (see step S5 in FIG. 6). For example, when the statistics information memory 17 has a bit width of "Bit_width-m" (where, m is a natural number satisfying "m<Bit_width" and represents the number of reduction in bit width), the processor 15 judges whether or not the count value after the addition is greater than $2^{Bit\_width-m}$.

When the statistics information memory 17 does not overflow (i.e., the count value $\leq 2^{Bit\_width-m}$ is satisfied) (see No route of step S5 in FIG. 6), the processor 15 writes the count value after the addition into the statistics information memory 17 (see step S8 in FIG. 6 and symbol (c) in FIG. 7).

On the other hand, when the statistics information memory 17 overflows (i.e., the count value $>2^{Bit\_width-m}$ is satisfied) (see Yes route of step S5 in FIG. 6 and symbol (d) in FIG. 7), the processor 15 writes the corresponding entry ID into carry entry buffer 18 (see step S6 in FIG. 6) and writes the lower "Bit_width-m" bits of the count value into the statistics information memory 17 (see step S7 in FIG. 6).

Then, the controller 13 reads count values of respective entry IDs stored in the statistics information memory 17 and entry IDs stored in the carry entry buffer 18 (see symbols (e) and (f) in FIG. 7), and stores the collected and counted statistics information into the main memory 20. For example, the adder processor 19 adds "$(2^{Bit\_width-m}-1)$ 1" to the count value of main memory 20 associated with an entry ID stored in the carry entry buffer 18. In other words, the adder processor 19 adds the upper limit ($2^{Bit\_width-m}-1$) of the capacity of each memory region of the statistics information memory 17 and the count-up value "1" cleared due to occurrence of the overflow to the count value of the overflowing entry ID. If the count value of the same entry ID overflows a number of times, the adder processor 19 may add a value related to the number of times of occurrence of overflow, as the count-up value cleared due to occurrences of the overflow.

That makes the controller 13 possible to collect and count statistics information considering the count value with which the statistics information memory 17 overflows. Besides, the controller 13 can clear the count value and the entry ID after reading from the statistics information memory 17 and the carry entry buffer 18, respectively. This example is described on the assumption that the adder processor 19 carries out addition of the overflowing count values on the main memory 20. Alternatively, the addition is carried out in a buffer included in the adder processor 19 or in another data region. The collecting (reading from the carry entry buffer 18 and the statistics information memory 17) by the controller 13 may be performed at regular or irregular timings.

The above configuration and operation of the transmission apparatus 3 tolerates overflow of the statistics information memory 17, so that the memory capacity of the statistics information memory 17 can be reduced. Consequently, the hardware configuration of the transmission apparatus 3 can be more highly integrated.

Hereinafter, description will be made in relation to the effects of the method of information processing of this example.

(1.5) Effects of the First Embodiment

In general, the statistics information has the following properties.

For example, an amount of data that the statistics information processor 7 counts per second may be different with entry or may be uniform for all the entry. However, in either case, the total of count values of all the entries does not exceed the maximum amount of communicating data per second restricted by the IF section 6 of the transmission apparatus 3. Accordingly, the following formula (3) is established.

$$\text{Max}(V\_PS) \geq \sum_{n=1}^{entry\_num}(V\_PS[n]) \quad (3)$$

where, V_PS [n] represents an amount of communicating data per second for entry ID=n (n: natural number).

Specifically, even when the bit width (Bit_width) of the statistics information memory 17 is reduced, the number of entries which overflow for a predetermined time period is limited. For example, in cases where the bit width of the statistics information memory 17 is reduced by one bit, the number of prospective overflowing entries is one.

Here, assuming that two entry overflow, the following formula (4) is established.

$$\text{Polling\_cycle} \times \text{Max}(V\_PS) \geq \quad (4)$$

$$\text{Polling\_cycle} \times \sum_{n=1}^{entry\_num}(V\_PS[n]) \geq 2 \times 2^{Bit\_width-1} = 2^{Bit\_width}$$

However, the formula (4) is inconsistent with the formula (2).

$$\text{Bit\_width(bit)} > \log_2[\text{Max}(V\_PS) \times \text{Polling\_cycle}] \quad (2)$$

In the same manner, when the bit width is assumed to be reduced by m bits, the number "Entry_num_ovf" of prospective overflowing entries is expressed by the following formula (5).

$$\text{Entry\_num\_ovf}=(2^m-1) \quad (5)$$

Accordingly, an amount "Mem_dec" of reduction in memory capacity due to reduction in bit width of the statistics information memory 17 by m bits is expressed by the following formula (6).

$$\text{Mem\_dec}=m \times \text{entry\_num} \quad (6)$$

In the meantime, the memory capacity "Mem_inc" of the carry entry buffer 18 is expressed by the following formula (7)

$$\text{Mem\_inc}=\text{Entry\_num\_ovf} \times \text{Ceil}[\log_2(\text{entry\_num})]=(2^m-1) \times \text{Ceil}[\log_2(\text{entry\_num})] \quad (7)$$

where, the term "Ceil( )" represents a rounding-up function.

Accordingly, an amount X of reduction in memory capacity of the transmission apparatus 3 due to reduction in bit width of the statistics information memory 17 by m bits is expressed by the following formula (8).

$$X=(\text{Bit\_width}-m)-\text{entry\_num}+(2^m 1) \times \text{Ceil}[\log_2(\text{entry\_num})] \quad (8)$$

Figure 8:
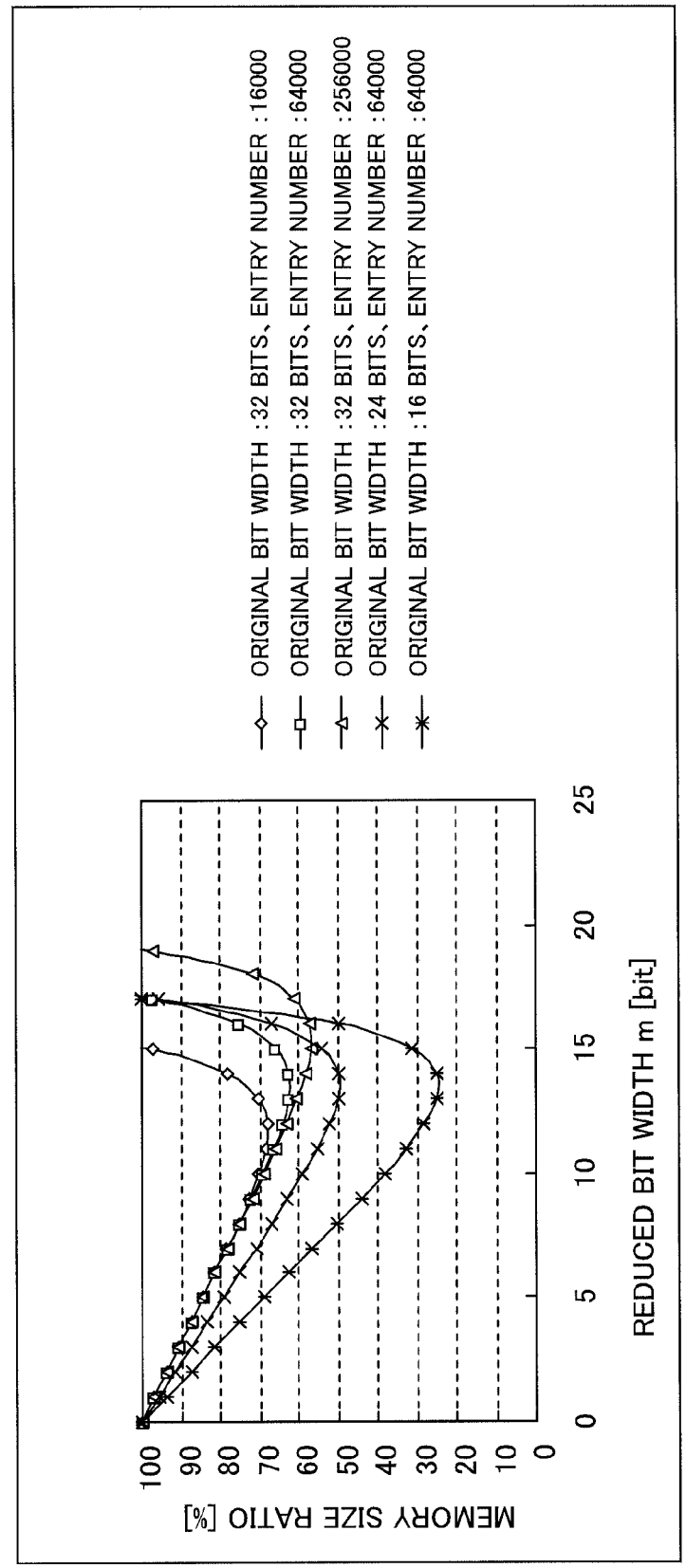
FIG. 8 is a diagram illustrating effects of memory reduction of a transmission apparatus according to the first embodiment.

Here, FIG. 8 illustrates a relationship between the reduced bit width "m" and the resultant memory size ratio based on the formula (8).

As illustrated in FIG. 8, the memory size ratio depends on the original bit width of the statistics information memory 17 and the total entry number. Reduction in bit width by 12 through 15 bits makes the memory capacity (memory size) of the transmission apparatus 3 possible to be reduced by 70% or more at the maximum.

(2) First Modification

The statistics information may include a number of kinds of pieces of information, which are exemplified by the number A of received frames free from errors and the number B of received frames having errors that establish an incompatible relationship.

Such statistic information piece A and statistics information piece B establish the following formula (9).

$$\text{Max}(V\_PS) \geq \sum_{n=1}^{entry\_num}(V\_PS\_A[n]+V\_PS\_B[n]) \quad (9)$$

where, "V_PS_A[n]" represents an amount of communicating data of the statistics information piece A for the entry ID=n per second and "V_PS_B[n]" represents an amount of communicating data of the statistics information piece B for the entry ID=n per second.

Accordingly, even in the above cases, reduction in bit width (Bit_width) of the statistics information memory 17 limits the number of prospective entries that overflow in a predetermined period.

Therefore, for statistics information pieces in an incompatible relationship from one another, the carry entry buffer 18 stores respective entries in conjunction with codes representing respective statistics information piece, so that the carry entry buffer 18 is commonly used by the different kinds of statistics information piece.

This embodiment may replace the carry entry buffer 18 of the transmission apparatus 3 with a carry entry buffer 18' capable of retaining statistics information kind codes (data kinds) representing kinds of statistics information piece.

For example, assuming that the transmission apparatus 3 collects a statistics information piece, such as "Ether MAC", the transmission apparatus 3 sometimes includes frame number counters one for each data length range. The frame number counters each count one of data lengths of, for example, 64 byte, 65 through 12 bytes, 128 through 255 bytes, 256 through 511 bytes, 512 through 1,023 bytes, 1,024 through 1,518 bytes, and 1,519 bytes or more. Values counted by the respective frame number counters are incompatible from one another. For example, possession of 3-bit statistics information kind codes which represent respective kinds of statistic information piece makes the transmission apparatuses 3 possible to share carry entry buffer 18'.

Figure 9:
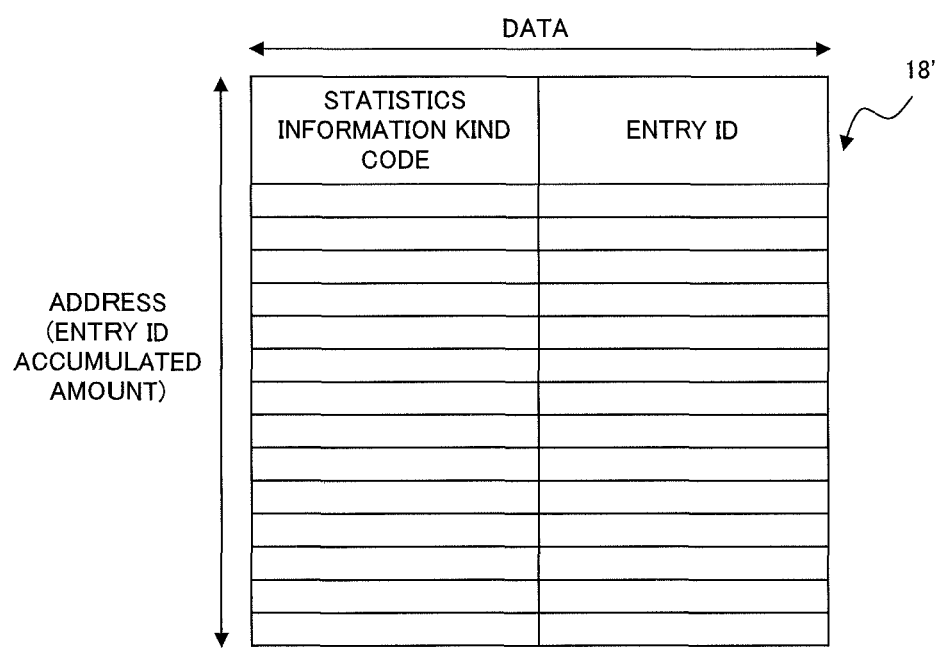
FIG. 9 is a diagram illustrating an example of a configuration of a carry entry buffer according to a first modification.

FIG. 9 illustrates an example of the configuration of the carry entry buffer 18' of this modification.

As the above, the carry entry buffer 18' of FIG. 9 includes a number of data regions that store overflowing entry ID and statistics information kind codes representing kinds of statistics information piece related to the overflow in the address direction which indicates an amount of accumulating of entry IDs.

The processor 15 may count statistics information pieces of input data pieces for each kind of statistics information piece or the statistics information memory 17 may store the result of counting for the respective statistics information kind codes into the memory regions associated one with each of the statistics information kind codes. Alternatively, the controller 13 may calculate the number of input data pieces or the size of each input data piece for each statistics information kind code on the basis of the result of the judgment (of overflowing) for each statistics information kind code stored in the carry entry buffer 18' and the result of counting for each statistics information kind code stored in the statistics information memory 17.

In the first modification, the carry entry buffer 18' can retain entry IDs for each kind of statistics information pieces, so that the transmission apparatuses 3 can use the carry entry buffer 18' commonly to different kinds of statistics information piece. Consequently, the memory size of each transmission apparatus 3 can further be reduced.

Figure 10:
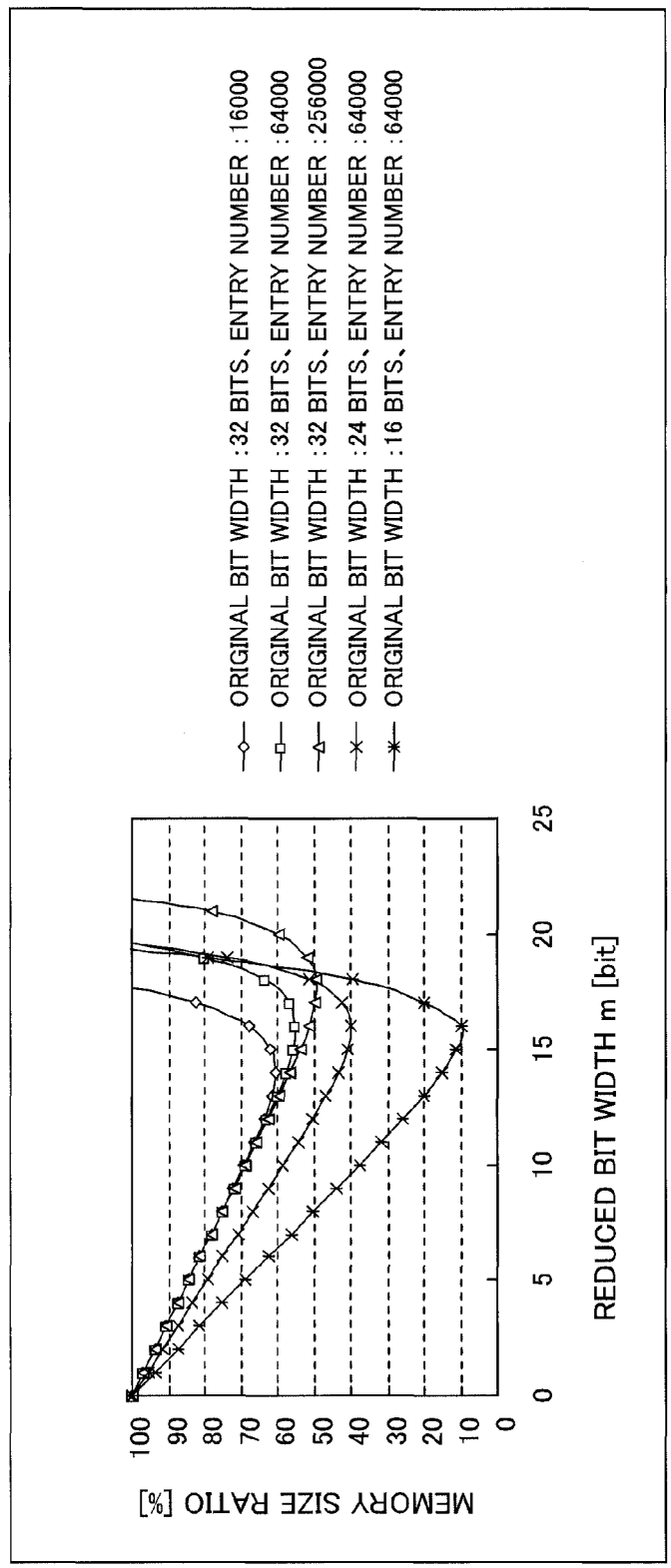
FIG. 10 is a diagram illustrating effects of memory reduction of a transmission apparatus according to the first modification.

Here, FIG. 10 illustrates a relationship between the reduced bit width "m" and the resultant memory size ratio in this modification. FIG. 10 exemplarily illustrates effects of memory reduction in cases where the carry entry buffer 18' stores six kinds of statistics information piece.

As illustrated in FIG. 10, the memory size ratio depends on the original bit width of the statistics information memory 17 and the tonal entry number. Reduction in bit width by 14 through 18 bits makes the memory capacity (memory size) of the transmission apparatus 3 possible to be reduced by 90% or more at the maximum.

(3) Others

Each component or each process of the transmission apparatus 3 described above may be selected or combined according to the requirement.

For example, if the number of entries to be monitored is larger than the maximum data amount (e.g., the maximum frame number) communicating the IF section 6 during a period of collecting and counting by the controller 13, the transmission apparatus 3 may omit the statistics information memory 17 included therein. In this case, each time a frame arrives at the transmission apparatus 3, the processor 15 records the entry ID of the arrived frame in the carry entry buffer 18 or 18', and the controller 13 collects and counts the entry IDs stored in the carry entry buffer 18 or 18' and manages the accumulated number as the count value of each entry being monitored. As a consequence, the statistics information for each entry ID can be collected and counted. Advantageously, the statistics information memory 17 can be omitted so that the memory size of the transmission apparatus 3 can be further reduced.

Additionally, in the above embodiment and modification, each transmission apparatus 3 includes memories 17, 18 (18'), and 20 in separated forms, but alternatively, the transmission apparatus 3 may include a single common memory having regions one allocated to each of the memories 17, 18 (18'), and 20.

It is possible to reduce the memory size of the transmission apparatus.

Furthermore, it is also possible to highly integrate the hardware configuration of the transmission apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment has been described in detail, it should be understood that the various changes, substitutions, and alterations could be made hereto without departing from the spirit and scope of the invention.

What is claimed is:

1. A signal processor comprising:
a first processor that counts, for each of identification information pieces included in input data pieces, the number of the input data pieces or a size of each of the input data pieces;
a first memory that comprises a plurality of memory regions each of which has a width of N (natural number) bits, and stores results of the counting by the first processor for respective identification information pieces into the plurality of memory regions associated with respective identification information pieces; and
a second memory that records whether each of the results of the counting exceeds a capacity of the memory region, wherein
the first processor judges whether or not each of the results of the counting exceeds the capacity for each of the identification information pieces, and records, for each of the identification information pieces, an entry ID associated with the identification information piece when the result of the counting for the identification information piece is judged to exceed the capacity, the entry ID representing the result of the judging, and the signal processor comprises:
  a second processor that calculates the number of the input data pieces or the size of each of the input data pieces for each of the identification information pieces by adding a value based on the number of entry IDs for each of the identification information pieces recorded in the second memory to the result of the counting for each of the identification information pieces stored in the first memory.

2. The signal processor according to claim 1, wherein the first processor stores, when the result of the counting exceeds the capacity of the memory region, a difference between the result of the counting and an upper limit of the capacity into the memory region.

3. The signal processor according to claim 1, further comprising a controller that calculates the number of the input data pieces or the size of each of the input data pieces based on contents of the first memory and contents of the second memory.

4. The signal processor according to claim 1, wherein the first processor counts, for each of data kinds of the input data pieces, the number of the input data pieces or a size of each of the input data pieces, judges whether or not each of the results of the counting exceeds the capacity and records a result of the judging into the second memory, and the second memory stores a result of the judging for each of data kinds of the input data pieces.

5. The signal processor according to claim 4, wherein the first memory comprises a plurality of memory regions each of which has a width of N (natural number) bits, and stores the results of the counting by the first processor for the respective data kinds into the plurality of memory regions associated one with each of the data kinds.

6. The signal processor according to claim 4, wherein the judging is performed for each of the data kinds.

7. The signal processor according to claim 6, further comprising a controller that calculates the number of the input data pieces or the size of each of the input data pieces for each of the data kinds based on the result of the judging for each of the data kinds stored in the second memory and the result of the counting for each of the data kinds stored in the first memory.

8. A transmission apparatus comprising a signal processor that comprises:
  a first processor that counts, for each of identification information pieces included in input data pieces, the number of the input data pieces or a size of each of the input data pieces;
  a first memory that comprises a plurality of memory regions each of which has a width of N (natural number) bits, and stores results of the counting by the first processor for respective identification information pieces into the plurality of memory regions associated with respective identification information pieces; and
  a second memory that records whether each of the results of the counting exceeds a capacity of the memory region, wherein
  the first processor judges whether or not each of the results of the counting exceeds the capacity for each of the identification information pieces, and records, for each of the identification information pieces, an entry ID associated with the identification information piece when the result of the counting for the identification information piece is judged to exceed the capacity, the entry ID representing the result of the judging, and
  the signal processor comprises:
  a second processor that calculates the number of the input data pieces or the size of each of the input data pieces for each of the identification information pieces by adding a value based on the number of entry IDs for each of the identification information pieces recorded in the second memory to the result of the counting for each of the identification information pieces stored in the first memory.

9. A method for processing signals comprising:
  counting, for each of identification information pieces included in input data pieces, the number of the input data pieces or a size of each of the input data pieces;
  storing results of the counting for respective identification information pieces into a plurality of memory regions associated with respective identification information pieces, the plurality of memory regions, each of which has a width of N (natural number) bits, being included in a first memory;
  judging whether or not each of the results of the counting exceeds the capacity of the memory region for each of the identification information pieces;
  recording, for each of the identification information pieces, an entry ID associated with the identification information piece into a second memory different from the first memory when the result of the counting for the identification information piece is judged to exceed the capacity, the entry ID representing the result of the judging; and
  calculating the number of the input data pieces or the size of each of the input data pieces for each of the identification information pieces by adding a value based on the number of entry IDs for each of the identification information pieces recorded in the second memory to the result of the counting for each of the identification information pieces stored in the first memory.

10. The signal processor according to claim 1, wherein the value based on the number of the entry IDs is obtained by multiplying the number of the entry IDs by an incremental value, the incremental value obtained by adding a predetermined count-up value to an upper limit of the capacity.

* * * * *